(12) United States Patent
Shaw et al.

(10) Patent No.: US 7,939,805 B2
(45) Date of Patent: May 10, 2011

(54) METHOD AND APPARATUS FOR INFRARED SPECTROMETRY

(75) Inventors: Leslie Brandon Shaw, Woodbridge, VA (US); Jasbinder S. Sanghera, Ashburn, VA (US); Ishwar D. Aggarwal, Fairfax Station, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1301 days.

(21) Appl. No.: 11/155,927

(22) Filed: May 18, 2006

(65) Prior Publication Data
US 2010/0108886 A1 May 6, 2010

(51) Int. Cl.
*G01B 9/02* (2006.01)
*G01J 3/00* (2006.01)
*G01J 3/45* (2006.01)

(52) U.S. Cl. .............. 250/339.08; 250/339.07; 356/365; 356/482

(58) Field of Classification Search ............. 250/339.07, 250/339.08; 356/365, 482
See application file for complete search history.

(56) References Cited

U.S. PATENT DOCUMENTS

| 5,739,536 | A | * | 4/1998 | Bucholtz et al. | 250/341.2 |
| 5,949,935 | A | * | 9/1999 | Schaafsma et al. | 385/43 |
| 2006/0215170 | A1 | * | 9/2006 | Toida et al. | 356/479 |
| 2008/0018907 | A1 | * | 1/2008 | Beaulieu et al. | 356/482 |
| 2008/0068607 | A1 | * | 3/2008 | Lecoeuche | 356/365 |

* cited by examiner

*Primary Examiner* — David P Porta
*Assistant Examiner* — Jessica L Eley
(74) *Attorney, Agent, or Firm* — Amy Ressing; Suresh Koshy (57) ABSTRACT

A Fourier-Transform Infrared (FTIR) spectrometer for operation in the mid- and long-wave infrared region (about 2-15 micron wavelengths) is disclosed. The FTIR spectrometer is composed of IR-transmitting fiber and uses a broadband IR source. A fiber stretcher is provided to provide a path difference between a first path and a second path having a sample associated therewith. Stretching of the fiber provides a path difference sufficient to generate an interferogram that can subsequently be analyzed to obtain information about a sample. A method for use of the apparatus of the invention is also disclosed. The method involves stretching of an IR-transmitting fiber to create a path difference sufficient to generate an interferogram. Various aspects of these features enable the construction of compact, portable spectrometers.

20 Claims, 8 Drawing Sheets

METHOD AND APPARATUS FOR INFRARED SPECTROMETRY

BACKGROUND OF THE INVENTION

1. Field of the Invention

The invention relates to the field of spectrometers. In particular the invention relates to Fourier-transform infrared (FTIR) spectrometers operating in the mid-wave IR (MWIR) and long-wave IR (LWIR) range.

2. Description of the Related Technology

A large number of applications exist for FTIR spectrometers operating in the MWIR and LWIR wavelength regions. The MWIR region encompasses wavelengths of about 2-7 µm and the LWIR region encompasses wavelengths of about 8-15 µm. These infrared regions provide distinguishing signatures for many organic and inorganic materials, and are sometimes known as the "fingerprint regions". These fingerprint regions can be useful in a variety of applications including analytical chemistry, biochemistry, and materials research. Additional applications may include environmental sensing, chemical bio-sensing, and condition-based maintenance. Currently, most FTIR spectrometer applications are laboratory based due to their large size and complexity. Small, compact FTIR spectrometers would be an enabling technology for many commercial and military applications that require field use of FTIR spectrometers.

Fiber FTIR spectrometers have been demonstrated in the near-IR at wavelengths of about 0.8 µm and 1.5 µm using single mode silica fiber and either a semiconductor laser at 0.8 µm, or an Er-doped silica fiber amplified spontaneous emission ("ASE") at wavelengths of 1.53 µm to 1.58 µm, as a source. Extension of the useful wavelengths into the mid-wave IR covering the 2-15 µm wavelength range, where FTIR spectrometers have their greatest applicability, appears to be impossible in silica due to the transmission window of silica fiber, which cuts off at around 2 µm. No MWIR or LWIR broadband sources exist that can be coupled with sufficient efficiency into a single-mode fiber to enable FTIR spectroscopy in these wavelength regions.

Some methods and devices have been disclosed in the past for performing spectroscopy in the mid-wave and long-wave IR region. Some of these methods and devices are discussed below.

U.S. Pat. No. 6,230,044 to Afanassieva et al. discloses fiber optic evanescent wave FTIR spectroscopy using fiber optic sensors operated in an attenuated total reflection regime in the middle infrared region. The useful wavelengths can be extended into the near infrared or the far infrared regions. The device utilizes spherical mirrors or focusing lenses.

U.S. Pat. No. 6,157,856 to Sanghera et al. discloses a FTIR spectrometer using a clad chalcogenide glass fiber core. The chalcogenide glass can transmit over a range of about 2-12 µm. A nichrome wire light source is also employed. U.S. Pat. No. 5,841,546 to Carangelo et al. also discloses a FTIR spectrometer having an optical fiber structure that includes a fiber core constructed of chalcogenide glass.

U.S. Pat. No. 5,754,715 to Melling discloses a fiber optic spectroscopic probe that is used with a FUR spectrometer. The probe is made of fiber optic bundles. The optical fibers are made from IR-transmitting materials, one of which is chalcogenide glass. The fiber optics can operate in the mid-IR range.

U.S. Pat. No. 5,739,536 to Bucholtz et al. discloses a FTIR and an infrared transmitting chalcogenide optical fiber for receiving and analyzing reflected radiation. An IR source is used. Middle infrared radiation is preferably employed in this device.

Although the above patents disclose various arrangements for performing spectroscopy, they do not utilize components that enable the provision of compact and cost efficient FTIR spectrometers.

Therefore, there exists a need for methods and apparatus for performing FTIR spectroscopy in the MWIR and LWIR regions that enable the provision of compact and cost-efficient FTIR spectrometers. Accordingly, it is an object of certain embodiments of the invention to provide a method and apparatus for performing spectroscopy in the MWIR and LWIR regions.

SUMMARY OF THE INVENTION

In a first aspect, the present invention relates to a spectrometer for analyzing specimens in the infrared region. The spectrometer is provided with a broadband infrared source that emits broadband infrared radiation. A coupler is optically connected to the broadband infrared source for splitting broadband infrared radiation from the source. The spectrometer further includes a first optical path formed by a chalcogenide fiber capable of transmitting broadband infrared radiation optically connected to the coupler. The spectrometer additionally has a first reflector operably associated with the first optical path for reflecting broadband infrared radiation back to the coupler via the first optical path; a stretcher operably associated with the chalcogenide fiber forming the first optical path for stretching the length of the chalcogenide fiber, a second optical path formed by a chalcogenide fiber capable of transmitting broadband infrared radiation optically connected to the coupler; a sample positioned such that broadband infrared radiation traveling along the second optical path impinges upon the sample; a second reflector operably associated with the second optical path for reflecting broadband infrared radiation back to the coupler via the second optical path; and a detector optically connected to the coupler for detection of broadband infrared radiation from the coupler.

In a second aspect, the present invention relates to a method for using a spectrometer. The method includes the steps of emitting broadband infrared radiation from a source, splitting the emitted broadband infrared radiation; transmitting the split broadband radiation along first and second optical paths formed by chalcogenide fiber; stretching the chalcogenide fiber that forms the first optical path; associating a sample with the second optical path so that the broadband infrared radiation transmitted along the second optical path impinged on the sample; reflecting the transmitted broadband infrared radiation back along the first and second optical paths; coupling the reflected broadband infrared radiation; and transmitting the coupled, reflected broadband infrared radiation to a detector.

In a third aspect, the present invention relates to a spectrometer for analyzing specimens in the infrared region. The spectrometer includes a rare-earth doped chalcogenide fiber-containing broadband infrared source that emits broadband infrared radiation within a wavelength of 2-15 µm; a coupler optically connected to the broadband infrared source by a chalcogenide fiber for splitting broadband infrared radiation from the source; and a first optical path formed by a chalcogenide fiber capable of transmitting broadband infrared radiation optically connected to the coupler. The spectrometer further includes a first reflector operably associated with the first optical path for reflecting broadband infrared radiation back to the coupler via the first optical path; a piezoelectric stretcher operably associated with the chalcogenide fiber forming the first optical path for stretching the chalcogenide fiber; a second optical path formed by a chalcogenide fiber capable of transmitting broadband infrared radiation optically connected to the coupler; a sample positioned such that broadband infrared radiation traveling along the second optical path impinges upon the sample; a second reflector operably associated with the second optical path for reflecting broadband infrared radiation back to the coupler via the second optical path; a detector optically connected to the coupler for detection of broadband infrared radiation from the coupler; a Fourier Transform analyzer connected to the detector for analyzing an output of the detector; and wherein the chalcogenide fibers comprise at least one element selected from the group consisting of S, Se, and Te.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

This invention relates to a FTIR spectrometer that operates in the MWIR and LWIR wavelength regions, i.e. wavelengths of from about 2-15 µm. Unlike silica-based FTIR spectrometers that have been previously demonstrated, the enabling technologies for a fiber FTIR spectrometer operating in the MWIR and LWIR regions are IR transmitting chalcogenide glass fibers and broadband IR emitting sources that operate with a fiber stretcher. Such an instrument has numerous advantages over conventional FTIR spectrometers that utilize bulk optical elements and globars as IR sources. Replacement of the bulk optics and low efficiency IR sources with chalcogenide fiber and broadband IR sources that operate with a fiber stretcher enables the construction of compact, rugged FTIR spectrometers with large cost savings.

Since the attenuation of a chalcogenide fiber is more than about an order of magnitude lower than that of a fiber made of silica glass in the infrared beyond a wavelength of about 2 µm, the chalcogenide optical fiber used in the FTIR spectrometer can be as long as needed. This possibility is not present with other materials, such as polycrystalline materials, where length of the fiber may be limited by an unduly high attenuation due to scattering as well as the limitations of the actual fiber manufacturing process.

Both the core and the cladding of the IR fiber are typically made of chalcogenide glass, which is a vitreous material composed of the chalcogen elements of Group VI of the Periodic Table. These elements are usually mixed with elements of Groups IV and V to form conventional compound glasses. More particularly, chalcogenide glasses are made from materials containing at least one of the elements sulfur, selenium, and tellurium. Other elements can be added. Examples of other elements that can be combined with at least one chalcogen element include germanium, arsenic, gallium, indium, silicon, phosphorous and antimony. The chalcogenide glasses may include the elements or components in any form that renders the glasses suitable for transmission of broadband infrared radiation having a wavelength of about 2-15 µm.

Particularly useful chalcogenide glass compositions, in atomic percent, include the following: $As_{20}S_{80}$, $Ge_{30}As_{40}S_{30}$, $As_{40}S_{60}$, $As_2Se_3$, $As_2SeTe_2$, $Ge_{10}As_{50}Te_{40}$, $Ge_{15}As_{10}Se_{75}$, $Ge_{28}As_{12}Se_{60}$, $GeSeTe$, $Ge_3P_3Te_{14}$, $Ge_2PTe_7$ and $Ge_{30}As_{10}Se_{30}Te_{30}$.

Note that other types of chalcogenide fibers also exist. Photonic crystal fibers composed of chalogenide glass are another form of chalcogenide fiber. A photonic crystal fiber (PCF) is a unique fiber structure where the cladding of the fiber is formed by a microstructured glass region; i.e., an array of holes in a glass material. There are two types of photonic crystal fibers that have been produced. PCFs with air cores that guide tight by photonic bandgap effects are also known as photonic bandgap (PBG) fibers. PCFs with solid cores surrounded by a microstructured region are known as index guiding PCFs and guide light by an effective index similar to normal core clad fiber. Although the examples and descriptions below describe chalcogenide fibers, it is possible to use chalcogenide based PCFs, either air guiding PBG or index guiding PCFs. Consequently the term chalcogenide fiber should be understood as not only conventional solid core/solid clad chalcogenide fibers but chalcogenide based PCFs as well.

The use of chalcogenide fibers for remote chemical sensing is advantageous not only for the wide transmittance range provided, but also for chemical durability. Chalcogenide glass cannot be used in strongly basic environments because it undergoes chemical attack. However, there are numerous environments where chalcogenide fibers can be used. For instance, chalcogenide glass does not react with water, unlike fluoride glass, and can therefore be used in aqueous environments. Additionally, chalcogenide glass can be used in acidic and organic environments.

Although the cladding of the fiber is typically made of a chalcogenide glass, it can be made of another glass, if desired. The cladding can be made from chalcohalide glasses that are prepared from mixtures of halide and chalcogenide glass components. Halide glasses have relatively poor chemical durability and low glass transition temperatures, especially the non-fluoride glasses. In contrast, chalcogenide glasses are known for their chemical durability, but their relatively high refractive indices give rise to high reflectivities from the glass surface. Chalcohalides have some beneficial characteristics of both types of glasses.

A standard FTIR spectrometer is comprised of an interferometer in which each wavelength from a source produces its own characteristic interference pattern as a movable mirror is displaced. A monochromatic source yields a cosine variation in intensity of the combined beams at the detector. The period of the cosine function is uniquely determined by the wavelength at the optical path difference for the radiation beams in the two arms of the interferometer. Each wavelength has its own characteristic cosine intensity pattern with a particular magnitude. As the optical path is changed via movement of the mirror, an interferogram is generated which, for a broadband source, is the sum of the intensities of each wavelength pattern. Using Fourier analysis the interferogram can be converted into a spectrum of intensity vs. wavelength.

Figure 3:
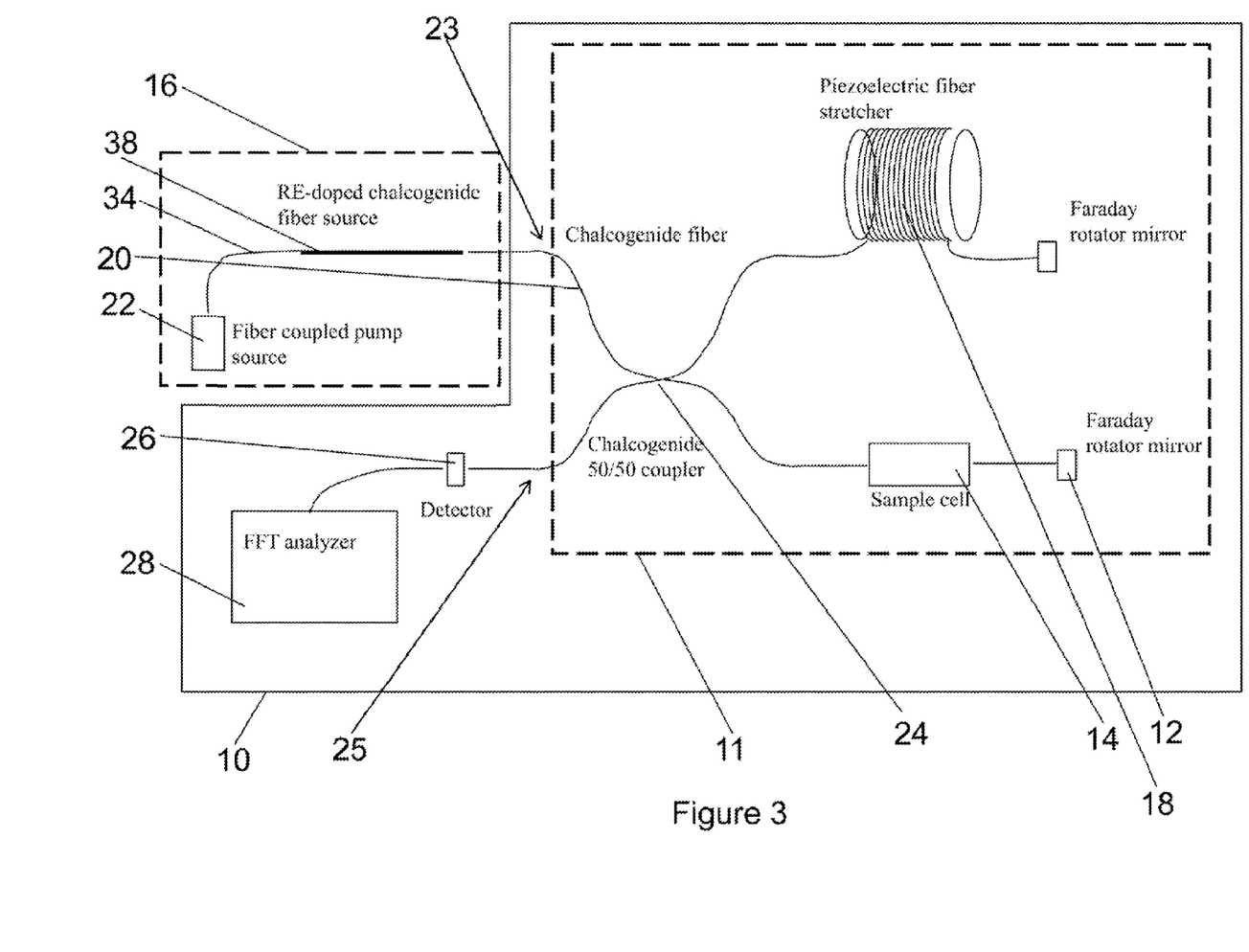
FIG. 3 shows a schematic of a fiber FTIR spectrometer according to one embodiment of the invention.

In a fiber FTIR, the optical arms of the interferometer 10, such as first arm 23 and second arm 25, shown in FIG. 3, are composed of optical fiber that is optically connected to a broadband infrared source 16. By the term, "optically connected" is meant that there is a connecting structure that is connected in such a way that it is capable of transmitting broadband infrared radiation between the two devices that are optically connected to one another. Stretching the fiber 23 using a stretcher 18 generates the optical path difference between one arm 23 and the other arm 25, of the interferometer 10. By wrapping the fiber several times around fiber stretcher 18, large optical path differences can be generated with high reproducibility by small displacements of the fiber stretcher 18. For example, the limit of resolution of a FTIR spectrometer is:

$$\Delta \upsilon = \frac{1}{2} D \quad (1)$$

where $\Delta \upsilon$ is the resolution in cm$^{-1}$ and D is the path difference in centimeters. For a resolution of 1 cm$^{-1}$, a path length distance of D=0.5 cm is needed. For a conventional FTIR spectrometer with moving mirrors, the mirror must move a distance of 0.5 cm. For a fiber FUR spectrometer with a fiber wound 100 revolutions around a mandrel of a fiber stretcher 18, the mandrel circumference be displaced only about 50 µm to achieve the same 0.5 cm path length distance. Piezoelectric crystal transducers easily effectuate such displacements, and the use of such enables the spectrometer to be constructed in a more compact fashion than conventional FTIR spectrometers employing moving mirrors to achieve the desired path length.

IR-transmitting chalcogenide glass is a useful technology that enables fiber FTIR spectrometers to operate in the MWIR and LWIR ranges. Chalcogenide glasses possess lower phonon energies than silica-based or fluoride-based glasses and can transmit much longer wavelengths. Typically, the transmission window for these glasses extends from the near-IR to about 15 µm, depending upon the specific glass composition.

Figure 1:
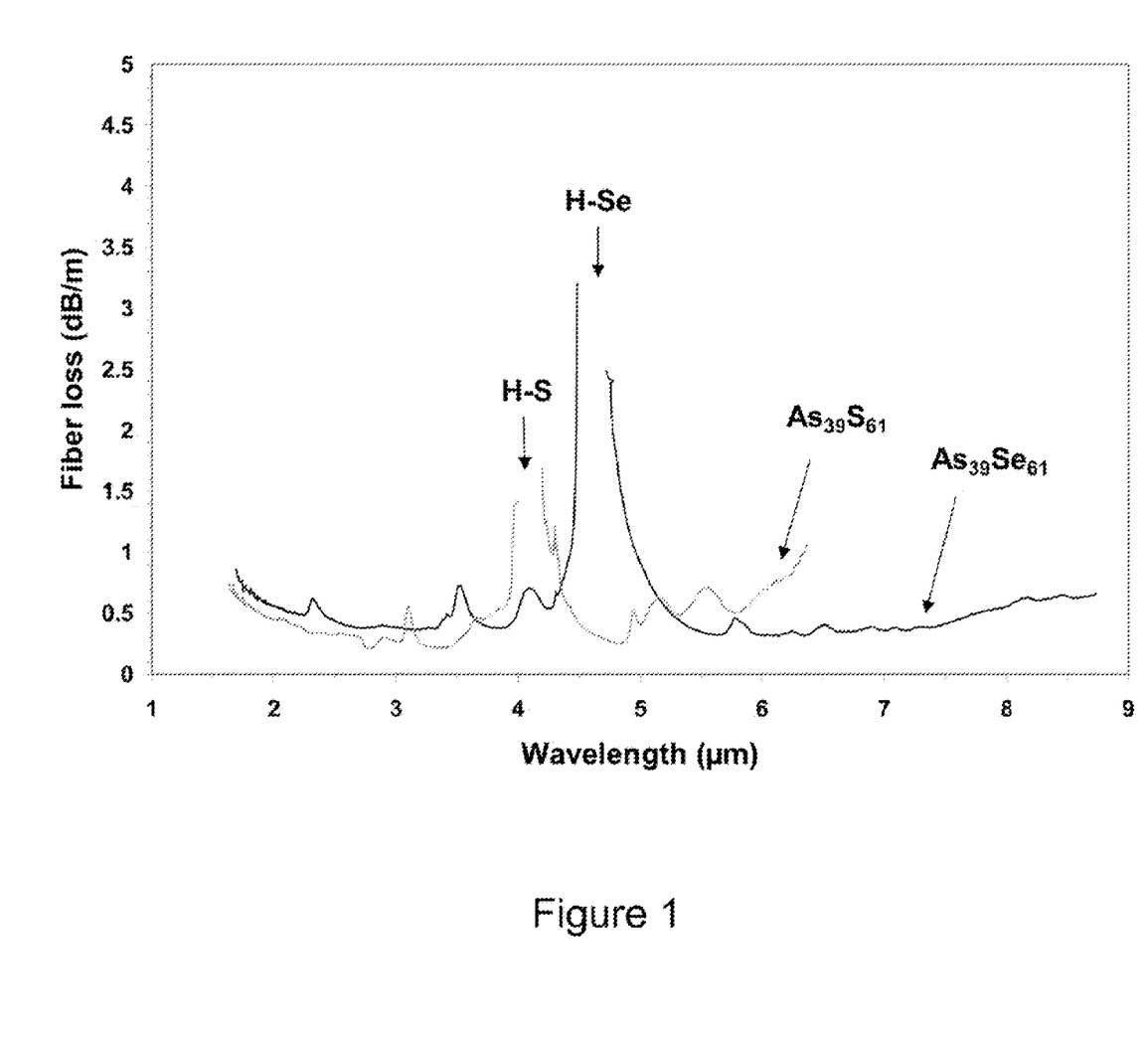
FIG. 1 shows a graph of fiber loss versus wavelength depicting the transmissions of As—S and As—Se fibers.

Single-mode low loss fibers have been produced in both As—S and As—Se fibers. The transmission range of As—S and As—Se fibers is shown in FIG. 1. Specifically the compositions of the fibers shown in FIG. 1 are $As_{39}S_{61}$ and $As_{39}Se_{61}$.

Figure 8:
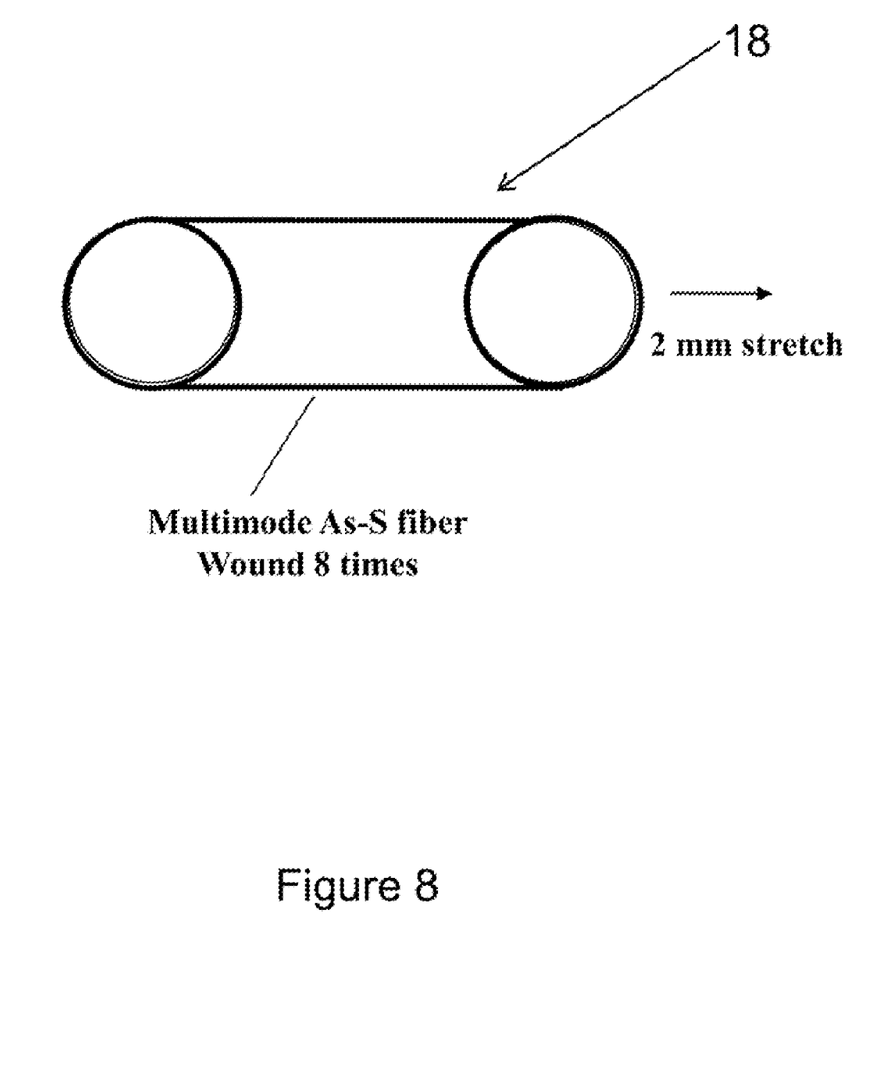
FIG. 8 shows a diagram of a fiber stretcher.

In one embodiment of a chalcogenide based fiber FTIR spectrometer, a multimode As—S fiber is wound around a piezoelectric fiber stretcher 8 times, as shown in FIG. 9. The fiber is then stretched to determine the limit of stretch before breaking. It is possible to stretch the fiber by approximately 2 mm. This corresponds to a path difference of about 1.6 cm. Such a path difference in an FTIR spectrometer would correspond to a resolution of 0.3 cm$^{-1}$. This resolution is more than adequate for a majority of applications in the MWIR and LWIR spectrum range.

Broadband IR Sources for the FTIR must be of high enough intensity to couple efficiently into single-mode fiber. The only source currently commercially available for broadband IR light is a globar. Coupling of light from a globar, however is inefficient. For example, the radiance as a function of temperature L(T) over the 3-5 µm region is given by:

$$L(T) := \int_3^5 \frac{2 \cdot c^2 \cdot h}{\lambda^5 \cdot \left( \exp\left( \frac{h \cdot c}{\lambda \cdot k \cdot T} \right) - 1 \right)} d\lambda \quad (2)$$

Where c is the speed of light, h is Planck's constant, $\lambda$ is the wavelength, k is Boltzmann's constant and T is temperature. For a globar that typically operates at 1100 K, the radiance is approximately 2.9 W/cm$^2$·sr. The amount of power that can be coupled into a fiber is given by $$P(T) := \pi^2 \cdot r^2 \cdot NA^2 \cdot L(T) \quad (3)$$

Where r is the fiber core radius and NA is the numerical aperture of the fiber. For a fiber that is single mode at 3 µm with NA=0.2, and a core diameter of 11.4 µm, the maximum amount of power that can be coupled in the fiber is about 38 nW, assuming loss-less coupling. By comparison, Pr-doped chalcogenide fibers (i.e. a chalcogenide rare-earth doped fiber) can produce greater than about 40 µW of power broadband in the 3-5 µm region. These fiber broadband IR sources can be readily scaled to any dimension and retain the same power output. Such power levels are 1000 times greater than available with coupling of emissions from globar sources and can greatly increase the sensitivity, dynamic range and scan speed of the FTIR spectrometer. Further development continues to increase the sensitivity, dynamic range and scan speed of the FTIR spectrometer, and also continues to increase the output power of broadband IR sources. Other rare-earth doped fiber sources that can span the 2-15 µm band may be used in the present invention. Although a rare-earth doped source is shown as the broadband IR source 16, it is possible to use other broadband IR sources, such as LEDs (light emitting diodes), TDLs (tunable diode lasers), SLEDs (superluminescent diodes), and fiber supercontinuum sources.

Figure 2:
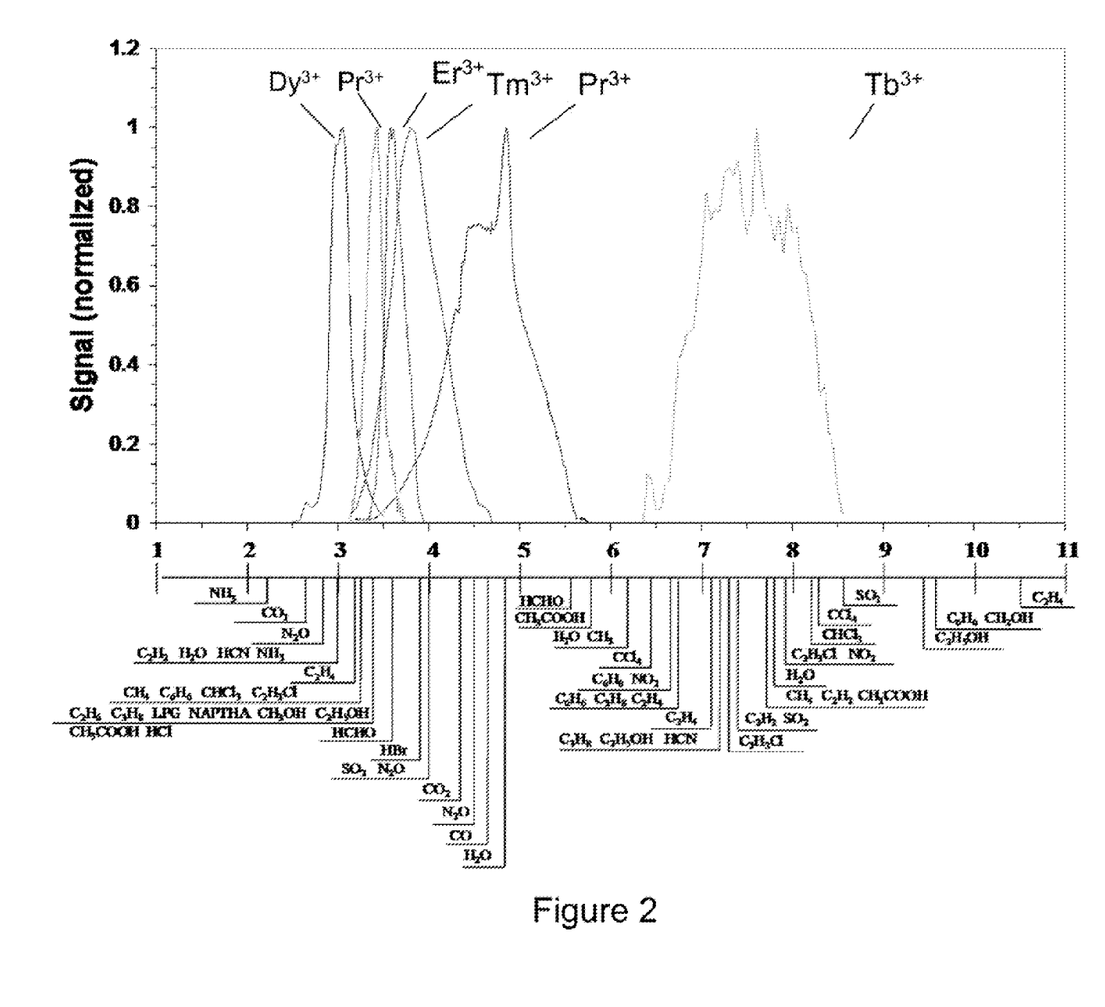
FIG. 2 shows the potential MWIR and LWIR rare-earth doped fiber source spectral outputs.

FIG. 2 shows MWIR and LWIR rare-earth doped fiber source spectral outputs that can be used as the broadband IR source 16 shown in FIG. 3. FIG. 2 also shows a graph correlating these wavelength bands with some important inorganic and organic chemical signatures used for chemical analysis. Some of the rare-earth ions that the fiber sources can be doped with are $Dy^{3+}$, $Pr^{3+}$, $Er^{3+}$, $Tm^{3+}$, and $Tb^{3+}$. Other possible rare-earth elements include: La, Ce, Nd, Pm, Sm, Eu, Gd, Tb, Ho, Er, Yb, and Lu.

FIG. 3 shows a schematic of a fiber FTIR spectrometer 10 that operates in the MWIR or LWIR wavelength regions. In FIG. 3, interferometer 11 is constructed of IR transmissive chalcogenide fiber 20 and a chalcogenide fiber coupler 24, which in the embodiment shown is a chalcogenide fiber 3 dB coupler. First arm 23 of interferometer 11 is made of a chalcogenide fiber coiled around a piezoelectric fiber stretcher 18 that is used to change the path length of the path formed by first arm 23 of the interferometer 11.

Figure 4:
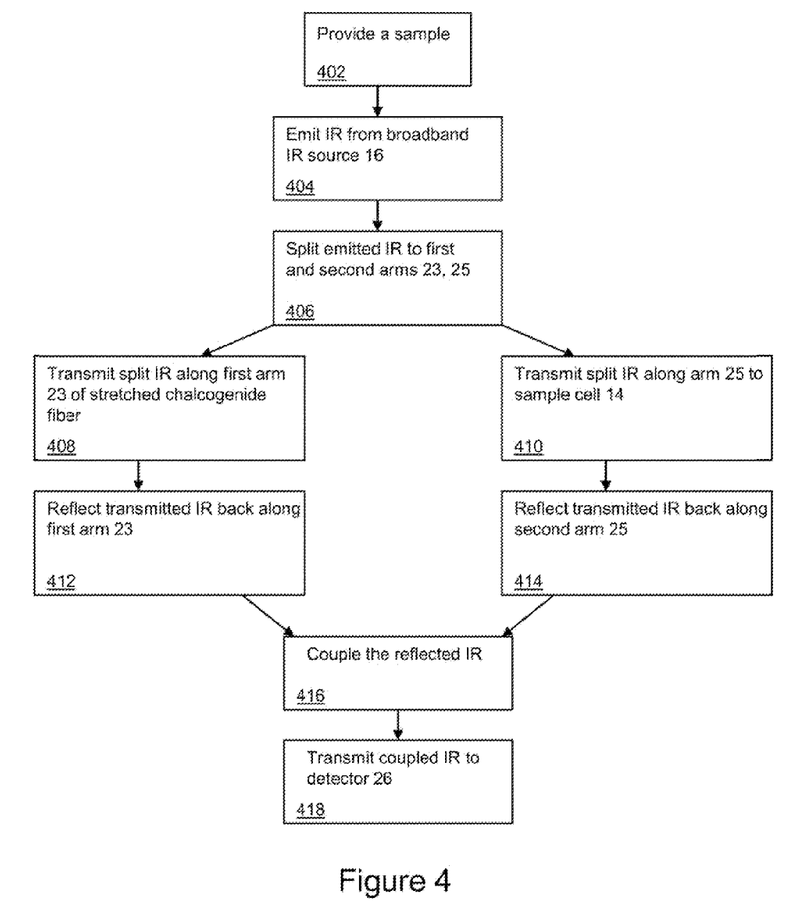
FIG. 4 is a flow chart describing a method of using the FTIR spectrometer shown in FIG. 3

FIG. 4 shows a flow chart describing a method of using spectrometer 10 shown in FIG. 3. In step 402, a sample is provided to sample cell 14. In step 404, IR radiation is emitted from the broadband IR source 16. Source 16 shown in FIG. 3 can be a rare-earth doped fiber source that in this embodiment is a Pr-doped source for the 3-5 µm wavelength region that is coupled to a fiber Michelson interferometer 11 and to fiber coupled pump source 22 via silica fiber 34. The IR radiation emitted from broadband IR source 16 is then split at step 406, and transmitted along first arm 23 formed by stretched chalcogenide fiber in step 408 and along second arm 25 formed by chalcogenide fiber to the sample provided to sample cell 14 in step 410.

In steps 412, 414, the transmitted IR radiation is reflected back toward coupler 24 by Faraday rotator mirrors 12 butt-coupled to the end faces of the fiber arms 23, 25. The Faraday rotator mirrors 12 are utilized for passive polarization compensation. In step 416, the reflected IR radiation is coupled by coupler 24. The coupled IR radiation is then transmitted to a detector 26 in step 418. Optionally, in step 420, a FFT spectrum analyzer 28 analyzes the interferogram generated as the chalcogenide fiber of first arm 23 is stretched. In the method; stretching the chalcogenide fiber of first arm 23 creates a path difference between first arm 23 and second arm 25. In one embodiment, the chalcogenide fiber of first arm 23 is continuously stretched over a period of time sufficient to generate a desired interferogram. In other embodiments, stretching can be carried out semi-continuously or periodically, as desired.

Figure 5:
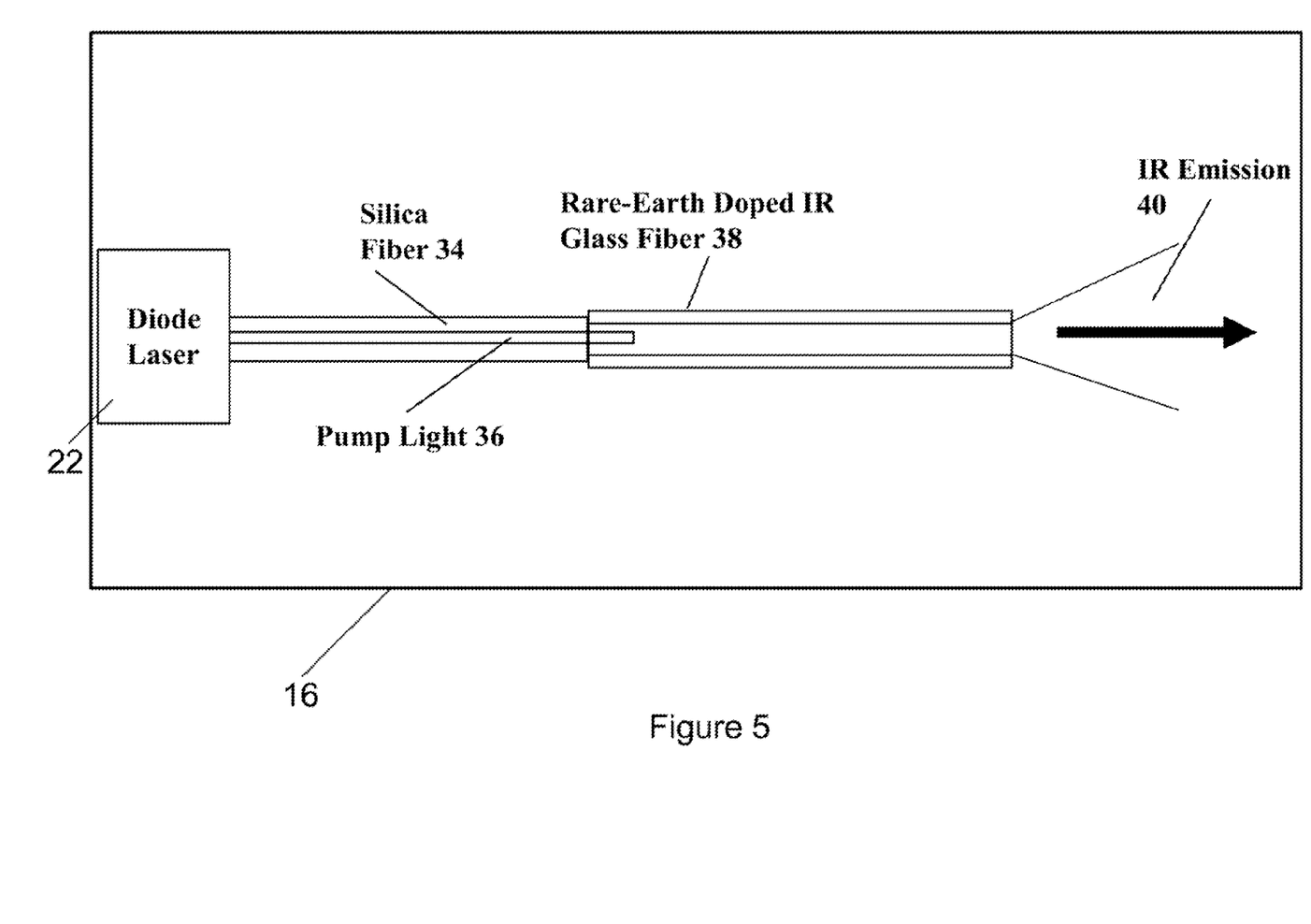
FIG. 5 shows a diagram of a broadband infrared source.

FIG. 5 shows a diagram of broadband IR source 16. Broadband IR source 16 utilizes a diode laser as a pump source 22 that is coupled to a rare-earth doped glass fiber 38 via silica fiber 34. Pump light 36 is transmitted from pump source 22 through silica fiber 34 and though the rare-earth doped glass fiber 38. IR emission 40 is in the long- to mid-wave range.

Figure 6:
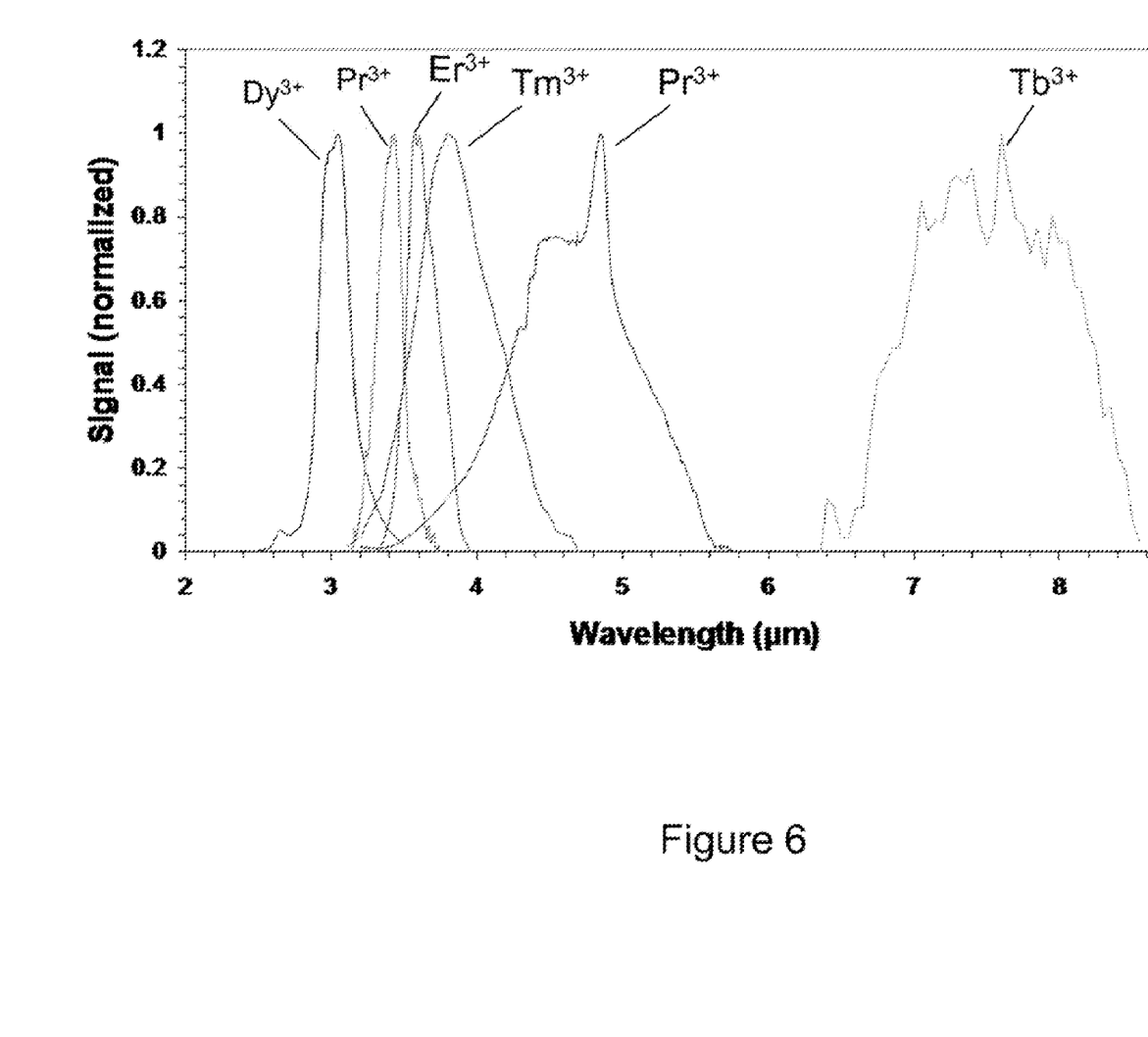
FIG. 6 is a graph depicting the wavelength ranges of the emitted infrared radiation depending upon which rare-earth element is used to dope the glass fiber.

FIG. 6 is a graph depicting the wavelength ranges of the IR emission 40 from broadband IR source 16, depending upon which rare-earth element is used to dope the glass fiber. In alternative embodiments, the rare-earth doped IR glass fiber 38 can be doped with different rare-earth elements. Some of these elements and their corresponding IR emission bands are shown in FIG. 6. The emission bands for embodiments using $Dy^{3+}$, $Pr^{3+}$, $Er^{3+}$, $Tm^{3+}$, and $Tb^{3+}$ are shown.

Figure 7:
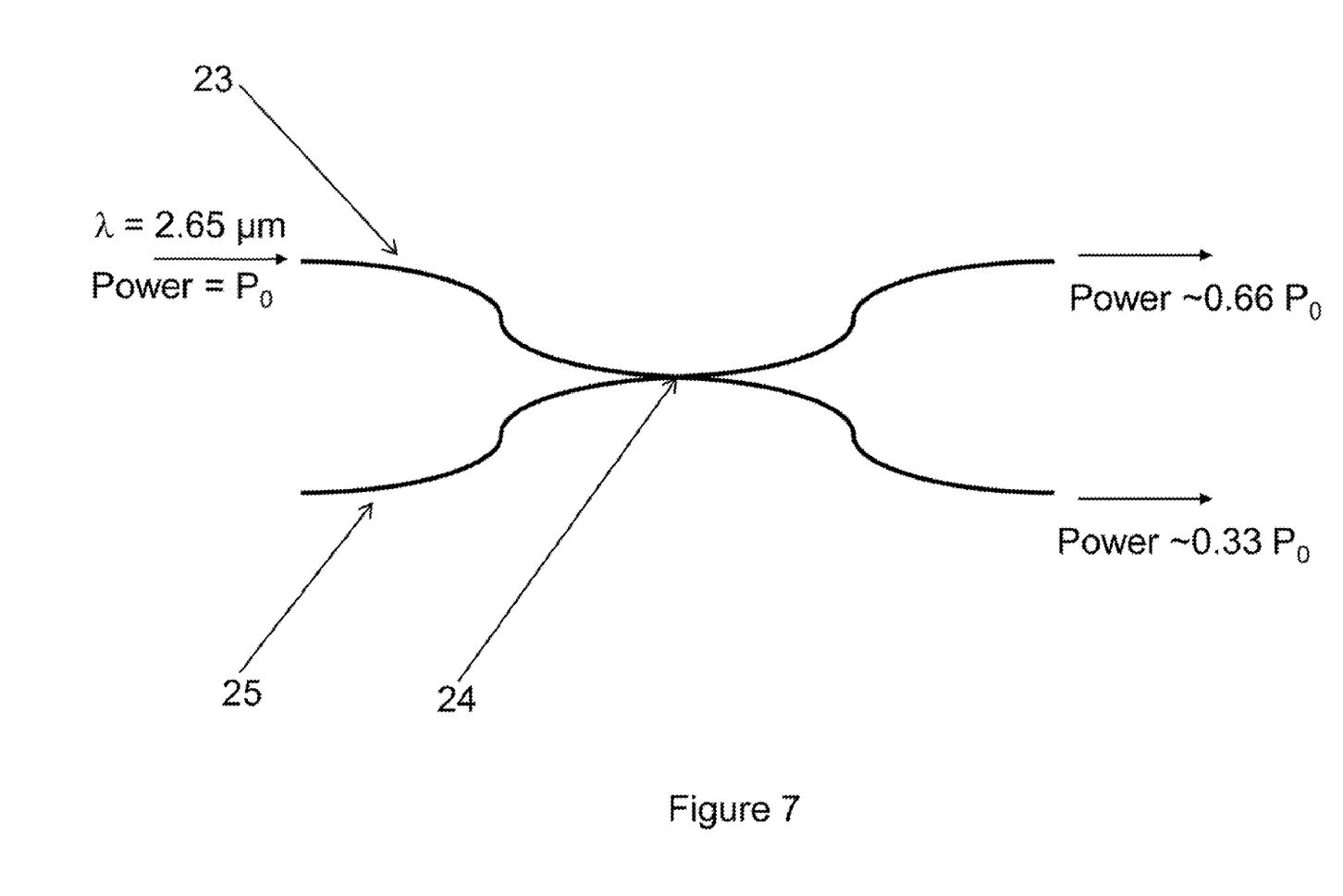
FIG. 7 shows a diagram of power outputs from a system using a chalcogenide fiber coupler.

FIG. 7 is a diagram of the beam splitting achievable using a chalcogenide fiber coupler 24. The diagram shows a radiation having a wavelength of 2.65 μm as the input to fiber coupler 24, and the respective power outputs of the two arms 23, 25 coupled to fiber coupler 24.

FIG. 8 is a diagram of fiber stretcher 12. In this embodiment, a multimode As—S fiber is wound 8 times around fiber stretcher 12. Fiber stretcher 12 is capable of providing a 2 mm stretch, as shown, and thus may be used instead of mirrors in order to provide a sufficient path difference to achieve the desired resolution using more compact equipment than if a mirror were used to provide the path difference. A 2 mm stretch of fiber stretcher 12 corresponds to a path difference of 1.6 cm, since the fiber is wound eight times around fiber stretcher 12. This enables a resolution of 0.3 $cm^{-1}$. Fiber stretchers other than piezoelectric fiber stretchers may alternatively be employed in the present invention so long as a sufficient stretch is provided to achieve the desired path difference and resolution for the system. It is also possible to stretch the fiber by application of heat, or by other conventional methods.

The FTIR spectrometer described above is an important spectroscopic tool that may facilitate use of spectrometers in many field applications in areas such as environmental sensing, material science, and biochemistry. Current technology relies on optical FTIR spectrometers that are technically complex, bulky, and not sufficiently portable for convenient use in the field. IR transmitting chalcogenide fibers coupled with broadband IR sources are a unique enabling technology for a fiber FTIR operating in the MWIR and LWIR spectral region.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A spectrometer for analyzing specimens in the infrared region comprising:
    a broadband infrared source that emits broadband infrared radiation;
    a coupler optically connected to said broadband infrared source for splitting broadband infrared radiation from said source;
    a first optical path formed by a chalcogenide fiber capable of transmitting broadband infrared radiation optically connected to said coupler;
    a first reflector operably associated with said first optical path for reflecting broadband infrared radiation back to said coupler via said first optical path;
    a stretcher operably associated with the chalcogenide fiber forming said first optical path for stretching the length of said chalocgenide fiber;
    a second optical path formed by a chalcogenide fiber capable of transmitting broadband infrared radiation optically connected to said coupler;
    a sample positioned such that broadband infrared radiation traveling along said second optical path impinges upon said sample;
    a second reflector operably associated with said second optical path for reflecting broadband infrared radiation back to said coupler via said second optical path;
    a detector optically connected to said coupler for detection of broadband infrared radiation from said coupler; and
    a FFT spectrum analyzer connected to said detector for analyzing an interoferogram output of said detector.

2. The spectrometer of claim 1, wherein said broadband infrared source is a rare-earth doped chalcogenide fiber source.

3. The spectrometer of claim 1, wherein said broadband infrared radiation has a wavelength of about 2-15 μm.

4. The spectrometer of claim 1, wherein said broadband infrared radiation has a wavelength of about 8-15 μm.

5. The spectrometer of claim 1, wherein said fiber stretcher is a piezoelectric fiber stretcher.

6. The spectrometer of claim 5, wherein said chalcogenide fiber comprises a chalcogenide selected from the group consisting of As—S and As—Se.

7. The spectrometer of claim 5, wherein said chalcogenide fiber comprises an element selected from the group consisting of S, Se, and Te.

8. The spectrometer of claim 5, wherein said chalcogenide fiber is a chalcogenide based photonic crystal fiber.

9. The spectrometer of claim 1, wherein said broadband IR source is selected from the group consisting of light emitting diodes, tunable diode lasers, superluminescent diodes, and fiber supercontinuum sources.

10. A method for using a spectrometer comprising the steps of:
    emitting broadband infrared radiation from a source;
    splitting said emitted broadband infrared radiation;
    transmitting said split roadband radiation along first and second optical paths formed by chalcogenide fiber;
    stretching said chalcogenide fiber that forms said first optical path;
    associating a sample with said second optical path so that the broadband infrared radiation transmitted along the second optical path impinged on said sample;

reflecting the transmitted broadband infrared radiation back along said first and second optical paths;
coupling said reflected broadband infrared radiation;
transmitting said coupled, reflected broadband infrared radiation to a detector; and
analyzing an interferogram output of the detector with a FFT spectrum analyzer to form a spectrum.

11. The method of claim 10, wherein said source is a rare-earth doped chalcogenide fiber source.

12. The method of claim 10, wherein said infrared radiation has a wavelength of about 2-15 μm.

13. The method of claim 10, wherein said infrared radiation has a wavelength of about 8-15 μm.

14. The method of claim 10, wherein said stretching is performed by a piezoelectric fiber stretcher.

15. The method of claim 10, wherein said chalcogenide fiber comprises a chalcogenide selected from the group consisting of As—S and As—Se.

16. The method of claim 10, wherein said chalcogenide fiber comprises an element selected from the group consisting of S, Se, and Te.

17. The method of claim 10, wherein said chalcogenide fiber is a chalcogenide based photonic crystal fiber.

18. The method of claim 10, wherein said broadband IR source is selected from the group consisting of light emitting diodes, tunable diode lasers, superluminescent diodes, and fiber supercontinuum sources.

19. The method of claim 10, wherein said stretching is carried out continuously over a period of time sufficient to generate the interoferogram output of the detector.

20. A spectrometer for analyzing specimens in the infrared region comprising:
a rare-earth doped chalcogenide fiber-containing broadband infrared source that emits broadband infrared radiation within a wavelength of about 2-15 μm;
a coupler optically connected to said broadband infrared source by a chalcogenide fiber for splitting broadband infrared radiation from said source;
a first optical path formed by a chalcogenide fiber capable of transmitting broadband infrared radiation optically to said coupler via said first optical path;
a piezoelectric stretcher operably associated with the chalcogenide fiber forming said first optical path for stretching the chalcogenide fiber;
a second optical path formed by a chalcogenide fiber capable of transmitting broadband infrared radiation optically connected to said coupler;
a sample positioned such that broadband infrared radiation traveling along said second optical path impinges upon said sample;
a second reflector operably associated with the second optical path for reflecting broadband infrared radiation back to said coupler via said second optical path;
a detector optically connected to said coupler for detection of broadband infrared radiation back from said coupler;
a Fourier Transform analyzer connected to said detector for analyzing an output of said detector; and
wherein said chalogenide fiber comprises at least one element selected from the group consisting of S, Se, and Te.

* * * * *